R. Fanning,
Drag Saw.
No 11,603.    Patented Aug. 29, 1854.
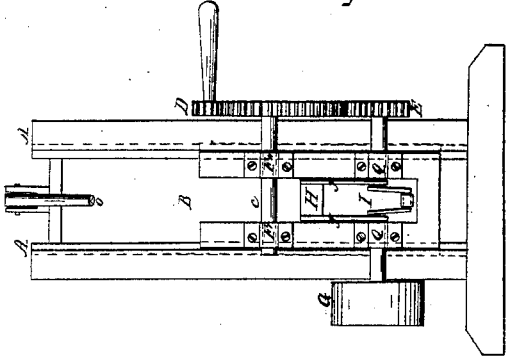
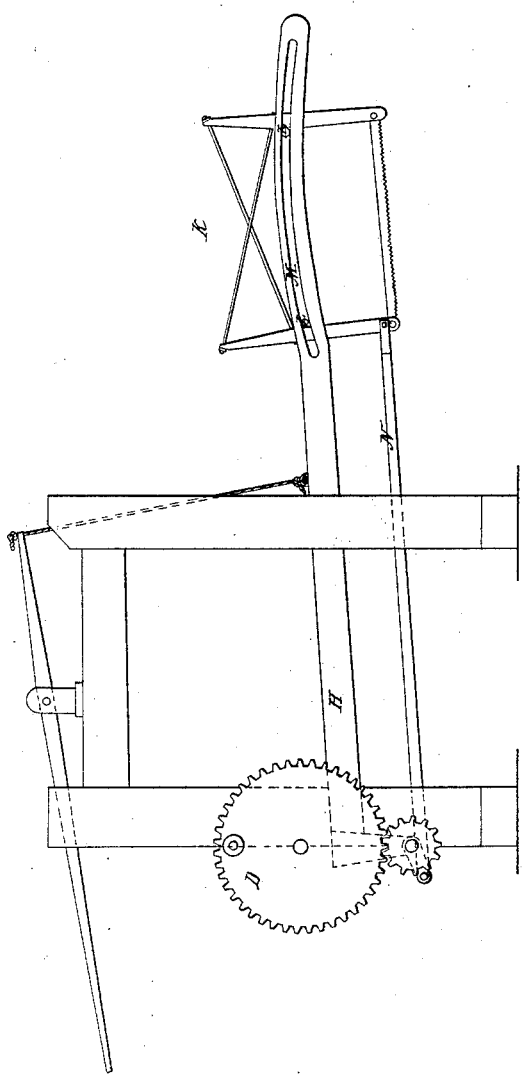

UNITED STATES PATENT OFFICE.

RICHARD FANNING, OF CLARKSFIELD, OHIO.

METHOD OF GRINDING CROSSCUT-SAWS.

Specification of Letters Patent No. 11,603, dated August 29, 1854.

*To all whom it may concern:*

Be it known that I, RICHARD FANNING, of Clarksfield, in the county of Huron and State of Ohio, have invented certain Improvements in Machinery for Crosscutting Timber and Logs; and I do hereby declare that the following is a full and exact description thereof, reference being had to the accompanying drawings and to the letters of reference marked thereon.

In order to describe the nature of my invention I will proceed to state some of the objects to be sought for in machinery for cross cutting timber which have not been fully attained until my invention, and the nature of the arrangements I have made for accomplishing these objects.

For cross cutting logs of wood or timber it is desirable to use as narrow and thin a saw as possible to avoid the friction and pinching of the sides of the saw consequent upon using a broad and thick plate, and to enable the saw to cut faster by having to cut less timber. A thin and narrow saw can not be used for this purpose unless it is strained in a frame or sash. A narrow and thin saw strained in a frame can not be ordinarily used for cross cutting large timber, unless guided by proper machinery on account of the difficulty of preserving a direct forward and backward movement to the saw and thus continuing the section in the same vertical plane.

One of my improvements consists in overcoming this difficulty by hanging a thin and narrow saw properly strained in a guide or sash beam projecting wholly beyond the main frame and so guided that the whole of the vertical section made by the saw is in the same plane, while at the same time the saw is otherwise arranged as to operate upon the timber in the most advantageous manner.

It is further desirable that a saw for cross cutting timber should have a rocking motion when in operation in connection with a direct forward and backward motion, that the saw may more readily clear itself, inasmuch as by giving the saw this motion it cuts only a part of the diameter of the log at one time. By this means the disadvantage of using a long crank for moving the saw is dispensed with. One of my improvements consists in giving this rocking movement to the saw in connection with a direct forward and backward motion.

It is desirable that the saw should be attached to machinery which will give it the required velocity and movement, while at the same time the weight or feed of the saw may be regulated according to the amount of power it is convenient to apply. One of my improvements is a combination of a hand lever with the guide beam or sash beam holding the saw for the purpose of regulating the feed of the saw.

It is also important to have machinery for cross cutting large timber so contrived that a saw constructed and operated as above described should be capable of being applied to large timber of various dimensions without the necessity of lifting the timber from its fixed position whatever it may be, and that whatever may be the size or position of the timber the saw shall always run in a line with the direction of the pitman. One of my improvements consists in effecting this object by rendering the sash beam holding the saw adjustable to timber of any dimension.

To enable others skilled in the art I will proceed to describe the construction and operation of my inventions and improvements.

I make a frame consisting of four upright posts connected by two upper and two bottom side girts. The posts rest in two feet of sufficient length to support the whole frame in an upright position. The anterior posts are connected by one of the feet and a cross girt. The space between the two posts is just sufficient for the play or movement of the sash beam to be hereafter described. The two posterior posts have grooves on the inside (A A Fig 1) from top to bottom to admit the up and down movement of a movable frame (B Fig 1). On this movable frame are fastened cast iron boxes on which play the journals of the gearing by which the saw is moved. The movable frame to which the gearing is attached is made to rise and fall so as to render the saw adjustable, after the main frame is fixed, to any size or position of the timber to be cut, and to adjust the crank to a proper position for working by hand. On the end of the shaft (C Fig 1 and 2) is a wheel (D Fig 1) which gears with the pinion (E E) and moves the crank (I Fig 1. The crank has a double bearing at (E' Fig 1) and (F'' Fig 1) is connected with the pulley (G Fig 1) to which a belt for driving the machinery may be attached. No part of the driving machinery above described is claimed as new, and it may be varied according to circumstances.

For the purpose of holding and guiding the saw I construct the beam (H Fig I & II) which I call the sash beam. This beam is attached at one end to the journals (Q Q) of the crank (I) by means of two projecting plates (J, J,) fastened to the end of the beam. The journals of the crank thus forms the pivot on which the sash beam moves. The crank (I) revolves between the two projecting plates. The sash beam projects beyond the main frame a sufficient distance to enable the logs to be cut to be clear of the main frame. In the end of the projecting part of the beam is a vertical slot or long mortise not shown on drawing in which the saw hangs and by means of which the saw is made to move directly forwards and backward in the same line.

The saw frame (K Fig II) consists of two uprights with a cross bar constructed mainly like the frame of an ordinary wood saw. The saw which I use is narrow and thin. The frame which serves for straining the saw is suspended in the sash beam (H) by means of the guides (L L Fig 2) which project from the cross bar of the frame and move in the curved slots. The frame of the saw is attached at one end to the pitman (N Fig 2) which is moved by the crank (I). On the top of the main frame is placed a hand lever (O). One end of the hand lever is connected with the sash beam by a rope or chain. At the other end is a weight By depressing this end of the lever by the weight or by hand the sash beam in which the saw moves is lifted above the timber to be cut and the feed of the saw is regulated by the gravity of the sash beam.

What I claim as my invention and improvement and desire to secure by Letters patent is—

1. The hanging of the saw frame in the sash beam by means of a vertical slot the curvilenear slot (M) and the guides (LL) in the manner above described; so that a backward and forward movement of the saw in a direct line is effected in combination with a rocking movement of the same.

2. The combination of the band lever (O) with the sash beam (H) in the manner above described for the purpose of regulating at pleasure the feed of the saw.

3. The arrangement of the sash beam (H) in the manner above described so as to be elevated or depressed by turning on the pivot or journal (Q) in combination with the movable frame sliding in the grooves (A A) for the purpose of rendering the saw adjustable to and capable of operating upon logs or timber of any dimensions and in various positions, while at the same time the movement of the saw is always kept in a line with the direction of the pitman (N) whatever may be the size or position of the timber to be cut.

R. FANNING.

Attest:
H. E. WHITE,
CHARLES ROWLAND.